(12) United States Patent
Takagi et al.

(10) Patent No.: US 12,424,956 B2
(45) Date of Patent: Sep. 23, 2025

(54) ELECTRIC MOTOR DRIVE APPARATUS, ELECTRIC MOTOR DRIVE METHOD, AND STORAGE MEDIUM

(71) Applicants: KABUSHIKI KAISHA TOSHIBA, Tokyo (JP); Toshiba Electronic Devices & Storage Corporation, Tokyo (JP)

(72) Inventors: Takashi Takagi, Kawasaki (JP); Toshimitsu Aizawa, Yokohama (JP); Tadashi Asukai, Yokohama (JP)

(73) Assignees: KABUSHIKI KAISHA TOSHIBA, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 75 days.

(21) Appl. No.: 18/363,795

(22) Filed: Aug. 2, 2023

(65) Prior Publication Data
US 2024/0048079 A1  Feb. 8, 2024

(30) Foreign Application Priority Data
Aug. 8, 2022  (JP) ................. 2022-126415

(51) Int. Cl.
*H02P 21/14* (2016.01)
*H02P 21/18* (2016.01)

(52) U.S. Cl.
CPC ............ *H02P 21/141* (2013.01); *H02P 21/18* (2016.02)

(58) Field of Classification Search
CPC .......... H02P 21/141; H02P 21/18; H02P 6/21; H02P 2203/03; H02P 21/34; H02P 23/0004; H02P 23/14; H02P 25/022; H02P 2207/05
See application file for complete search history.

(56) References Cited

U.S. PATENT DOCUMENTS

| | | | |
|---|---|---|---|
| 7,193,387 B1 * | 3/2007 | Lu | H02P 21/0021 388/906 |
| 11,837,982 B2 * | 12/2023 | Tanaka | H02P 25/022 |
| 2009/0251083 A1 * | 10/2009 | Kinpara | H02P 5/74 318/400.11 |
| 2012/0091941 A1 * | 4/2012 | Hong | H02P 21/141 318/766 |

(Continued)

FOREIGN PATENT DOCUMENTS

| | | |
|---|---|---|
| JP | 2007-174747 A | 7/2007 |
| JP | 4529596 B2 | 8/2010 |

(Continued)

*Primary Examiner* — Bickey Dhakal
(74) *Attorney, Agent, or Firm* — Oblon, McClelland, Maier & Neustadt, L.L.P.

(57) ABSTRACT

An electric motor drive apparatus includes an electric motor. A power conversion device, a controller, and a current detector. The controller calculates a phase of an armature flux linkage of the electric motor by using a flowing current detected by the current detector. The calculating a phase of an armature flux linkage of the electric motor includes calculating an armature flux linkage of the electric motor including an initial value of an armature flux linkage of the electric motor which is calculated from a rotational position of the electric motor estimated by using a motor flux of the electric motor measured in advance and the flowing current.

4 Claims, 2 Drawing Sheets

(56) References Cited

U.S. PATENT DOCUMENTS

2016/0036364 A1    2/2016  Yamazaki et al.
2023/0353075 A1*  11/2023  Hozuki ................... H02P 21/18
2023/0396197 A1*  12/2023  Li ......................... H02P 21/141

FOREIGN PATENT DOCUMENTS

| JP | 5744151 B2 | 7/2015 |
|---|---|---|
| JP | 6375757 B2 | 8/2018 |
| JP | 6908888 B2 | 7/2021 |

* cited by examiner

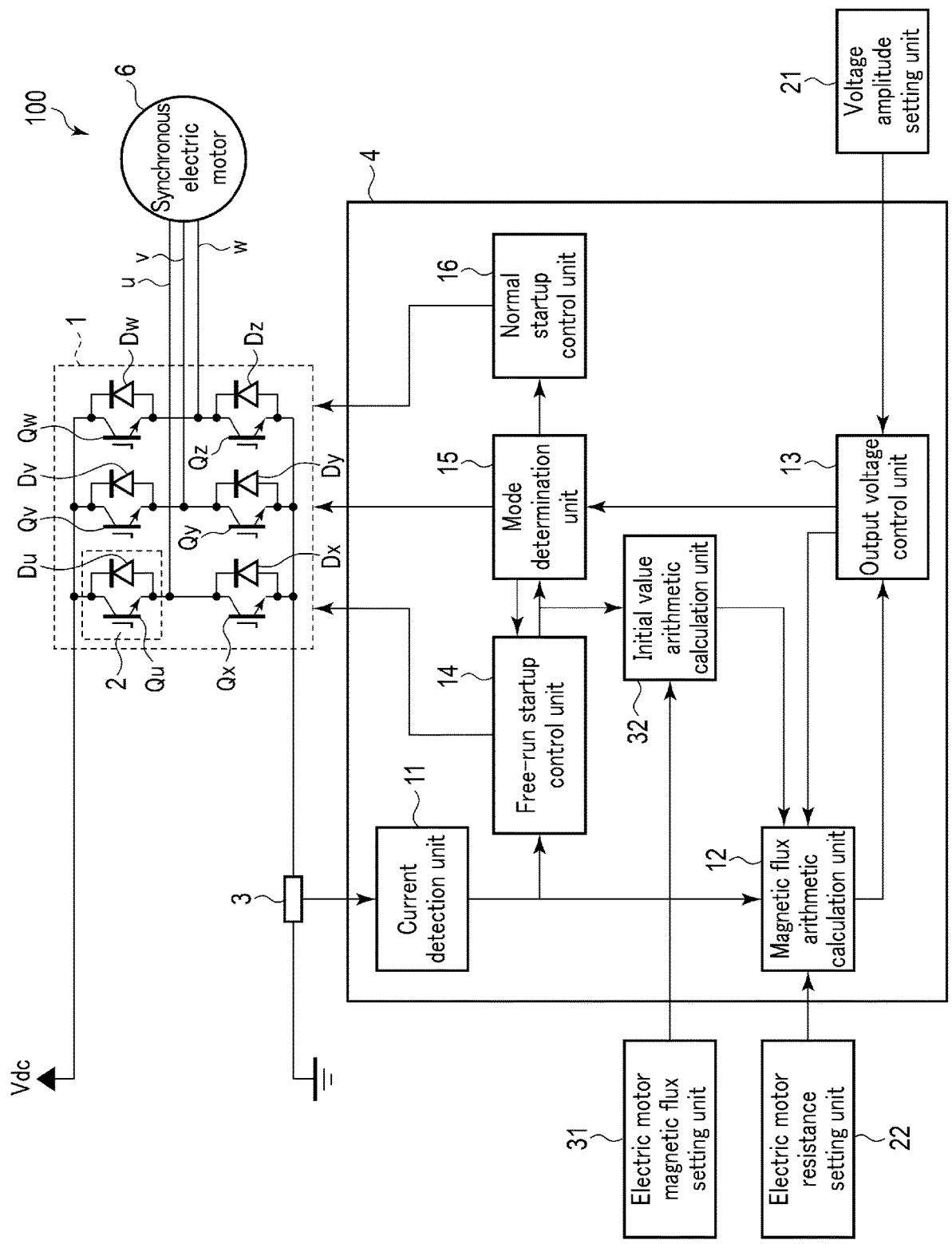
F I G. 1

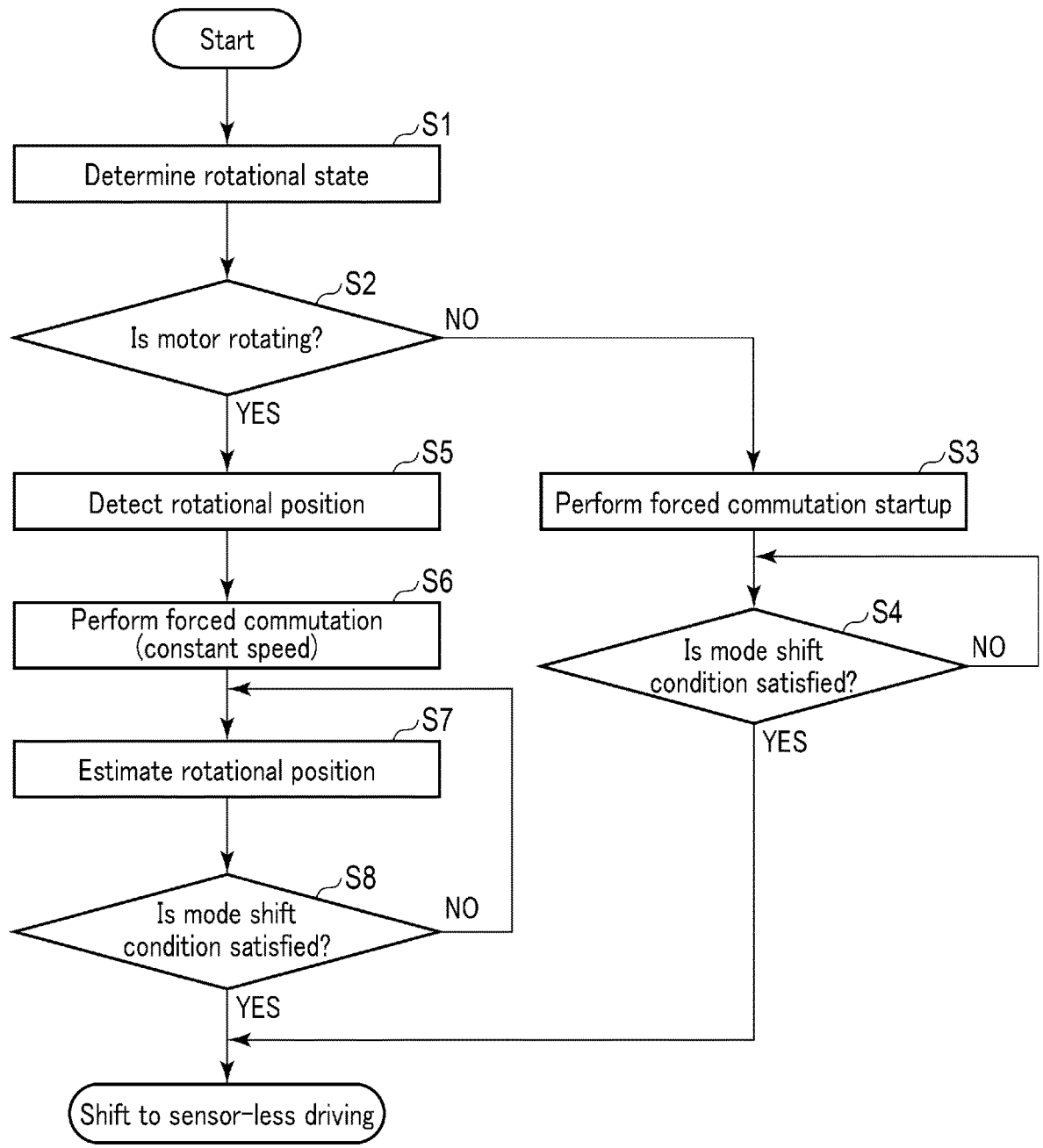
F I G. 2

ELECTRIC MOTOR DRIVE APPARATUS, ELECTRIC MOTOR DRIVE METHOD, AND STORAGE MEDIUM

CROSS-REFERENCE TO RELATED APPLICATIONS

This application is based upon and claims the benefit of priority from the Japanese Patent Application No. 2022-126415, filed Aug. 8, 2022, the entire contents of which are incorporated herein by reference.

FIELD

Embodiments described herein relate generally to an electric motor drive apparatus, an electric motor drive method, and a storage medium.

BACKGROUND

The main requirements for an electric motor system including an electric motor and a power conversion device that controls the drive of the electric motor include downsizing, cost reduction, and reliability improvement. There are various techniques to meet these requirements. For example, examples of techniques for meeting the requirements for the downsizing and the cost reduction include adopting position sensor-less control for omitting the rotational position sensor of an electric motor and adopting a control method based on DC current detection for the simplification of the detection means for an electric motor current.

The application products of the electric motor system include a product that is required to make startup from an idling state, that is, so-called free-run startup. The rotation state of the electric motor is unknown immediately after free-run startup. If, therefore, both free-run startup and position sensor-less control are used, it is necessary to estimate the rotational position of the electric motor before position sensor-less control. There are various techniques of estimating the rotational position of an electric motor. For example, a technique of estimating a rotational position by arithmetically calculating an armature flux linkage requires a settling period until the convergence of a magnetic flux arithmetic calculation result to a true value unless a proper magnetic flux initial value is given. Since control during such a settling period becomes unstable, the settling period is preferably as short as possible.

BRIEF DESCRIPTION OF THE DRAWINGS

FIG. 1 is a block diagram showing the arrangement of a drive apparatus according to an embodiment.

FIG. 2 is a flowchart showing an electric motor drive method in an operation until the shift to position sensor-less control of the drive apparatus.

DETAILED DESCRIPTION

In general, according to one embodiment, an electric motor drive apparatus includes an electric motor, a power conversion device, a controller, and a current detector. The power conversion device generates AC power for driving the electric motor. The controller controls the power conversion device. The current detector detects a flowing current in the electric motor. The controller calculates a phase of an armature flux linkage of the electric motor as a rotational position of the electric motor by using the flowing current detected by the current detector and generates a voltage command for controlling the power conversion device based on the armature flux linkage. The calculating a phase of an armature flux linkage of the electric motor as a rotational position of the electric motor includes calculating an armature flux linkage of the electric motor including an initial value of an armature flux linkage of the electric motor which is calculated from a rotational position of the electric motor estimated by using a motor flux of the electric motor measured in advance and the flowing current.

An embodiment will be described below with reference to the accompanying drawings. FIG. 1 is a block diagram showing the arrangement of a drive apparatus according to the embodiment. A drive apparatus 100 shown in FIG. 1 includes a power conversion device 1, a current detector 3, a controller 4, and a synchronous electric motor 6.

The power conversion device 1 converts the power supplied from a DC power supply Vdc into three-phase AC power for driving the synchronous electric motor 6 based on a command from the controller 4. The power conversion device 1 is, for example, a three-phase two-level inverter circuit constituted by six bridge-connected semiconductor elements 2. More specifically, the six semiconductor elements 2 are constituted by six switching elements Qu, Qv, Qw, Qx, Qy, and Qz and six free wheeling diodes Du, Dv, Dw, Dx, Dy, and Dz. Of the six switching elements, the switching element Qu and the switching element Qx are connected in series, the switching element Qv and the switching element Qy are connected in series, and the switching element Qw and switching element Qz are connected in series. The respective pairs of series-connected switching elements are connected in parallel. The contact point between the switching element Qu and the switching element Qx is connected to the u-phase terminal of the synchronous electric motor 6. Likewise, the contact point between the switching element Qv and the switching element Qy is connected to the v-phase terminal of the synchronous electric motor 6. The contact point between the switching element Qw and the switching element Qz is connected to the w-phase terminal of the synchronous electric motor 6. The six free wheeling diodes Du Dv, Dw, Dx, Dy, and Dz are connected in inverse-parallel to the corresponding switching elements Qu, Qv, Qw, Qx, Qy, and Qz. In this case, the power conversion device 1 need not always be formed as a three-phase two-level inverter circuit.

The current detector 3 detects a DC current flowed by the electromotive force of the synchronous electric motor 6 when the six switching elements Qu, Qv, Qw, Qx, Qy, and Qz are turned on/off in a special switching mode (to be described later). The current detector 3 is a shunt resistor installed in a common connection portion on the negative side of the DC section of the power conversion device 1, for example, the six switching elements Qu, Qv, Qw, Qx, Qy, and Qz. In this case, the current detector 3 is not specifically limited as long as it can detect a DC current flowed by the electromotive force of the synchronous electric motor 6. The current detector 3 may be a Hall current sensor installed near the DC section of the power conversion device 1.

The controller 4 is a computer that controls the drive of the synchronous electric motor 6 by ON/OFF-controlling the six switching elements constituting the power conversion device 1. The controller 4 is formed from, for example, an FPGA (Field Programmable Gate Array). The controller 4 may be formed from a processor such as a CPU (Central Processing Unit). The controller 4 operates as a current detection unit 11, a magnetic flux arithmetic calculation unit 12, an output voltage control unit 13, a free-run startup control unit 14, a mode determination unit 15, a normal startup control unit 16, and an initial value arithmetic calculation unit 32 by executing processing in accordance with an electric motor drive program. In addition, a voltage amplitude setting unit 21, an electric motor resistance setting unit 22, and an electric motor magnetic flux setting unit 31 are connected to the controller 4.

The current detection unit 11 outputs the DC current detected by the current detector 3 to the free-run startup control unit 14. In addition, the current detection unit 11 generates a three-phase current of the synchronous electric motor 6 from the DC current detected by the current detector 3 using a three-phase current reconstruction method typified by Japanese Patent No. 2563226 and outputs the generated three-phase current to the magnetic flux arithmetic calculation unit 12.

In order to estimate the rotational position of the synchronous electric motor 6, the magnetic flux arithmetic calculation unit 12 arithmetically calculates, as the rotational position of the synchronous electric motor 6, the phase of the armature flux linkage generated in the stator winding of the synchronous electric motor 6 based on the three-phase output voltage command value of the synchronous electric motor 6 which is generated by the output voltage control unit 13, and the electric motor resistance set by the electric motor resistance setting unit 22. In addition, in this embodiment, when estimating a rotational position during free-run startup, the magnetic flux arithmetic calculation unit 12 arithmetically calculates the phase of an armature flux linkage as the rotational position of the synchronous electric motor 6 based on the initial value of the armature flux linkage calculated by the initial value arithmetic calculation unit 32 in addition to the three-phase current generated by the current detection unit 11, the three-phase output voltage command value of the synchronous electric motor 6 which is generated by the output voltage control unit 13, and the electric motor resistance set by the electric motor resistance setting unit 22. In this embodiment, the magnetic flux arithmetic calculation unit 12 includes an imperfect integrator or second-order general integrator (SOGI).

The output voltage control unit 13 generates a three-phase output voltage command value for driving the synchronous electric motor 6 based on the voltage amplitude command value supplied from the voltage amplitude setting unit 21 and the phase of the armature flux linkage arithmetically calculated by the magnetic flux arithmetic calculation unit 12. In addition, the output voltage control unit 13 outputs the generated three-phase output voltage command value to the magnetic flux arithmetic calculation unit 12 and the mode determination unit 15.

The free-run startup control unit 14 turns on/off each switching element of the power conversion device 1 in a special switching mode based on the determination result obtained by the mode determination unit 15. The special switching mode is a mode for allowing the current detector 3 connected to the DC section to detect the current generated by the electromotive force of the synchronous electric motor 6. The special switching mode is configured to, for example, repeat the operation of turning one switching element, for example, one of the switching elements Qx, Qy, and Qz and turning off the remaining switching elements while sequentially switching the switching elements to be turned on. In addition, the free-run startup control unit 14 detects the rotational speed and rotational position of the synchronous electric motor 6 from the DC current detected by the current detection unit 11 when the power conversion device 1 is in the special switching mode and outputs the detection result to the mode determination unit 15 and the initial value arithmetic calculation unit 32. For example, the free-run startup control unit 14 can detect a phase as the rotational speed and rotational position of the synchronous electric motor 6 during free-run startup depending on whether the current detection unit 11 can detect a DC current in a combination of ON/OFF states and a corresponding combination when the switching elements Qu, Qv, Qw, Qx, Qy, and Qz are turned on/off in the special switching mode.

The mode determination unit 15 determines whether the free-run startup control unit 14 or the normal startup control unit 16 is to control the power conversion device 1. The mode determination unit 15 causes the free-run startup control unit 14 to control the power conversion device 1 if the synchronous electric motor 6 is idling and causes the normal startup control unit 16 to control the power conversion device 1 if the synchronous electric motor 6 is not idling. Whether the synchronous electric motor 6 is idling is determined from whether, for example, a flowing current can be detected in the current detector 3 during the special switching mode.

The normal startup control unit 16 turns on/off each switching element of the power conversion device 1 in the normal switching mode based on the determination result obtained by the mode determination unit 15. The normal switching mode is a mode in which, for example, all the switching elements Qu, Qv, Qw, Qx, Qy, and Qz are switching elements to be turned on/off.

The initial value arithmetic calculation unit 32 arithmetically calculates the initial value of the armature flux linkage of the stator winding of the synchronous electric motor 6 based on the rotational position of the synchronous electric motor 6 which is input from the free-run startup control unit 14 during free-run startup and the motor flux of the synchronous electric motor 6 which is set by the electric motor magnetic flux setting unit 31.

The voltage amplitude setting unit 21 includes, for example, a user interface (UI) connected to the controller 4 and receives a drive command for the drive apparatus 100 from the user. The drive command includes, for example, a command for the rotational direction or rotational speed of the synchronous electric motor 6. The voltage amplitude setting unit 21 generates a torque component voltage command and a phase component voltage command as voltage amplitude command values based on a drive command from the user. The voltage amplitude setting unit 21 then outputs the generated voltage amplitude command values to the output voltage control unit 13.

The electric motor resistance setting unit 22 includes, for example, a user interface (UI) connected to the controller 4 and receives the input of an electric motor resistance of the synchronous electric motor 6 from the user. The electric motor resistance can be measured at the time of, for example, designing the synchronous electric motor 6. The electric motor resistance may be stored in advance in, for example, the magnetic flux arithmetic calculation unit 12 of the controller 4.

The electric motor magnetic flux setting unit 31 includes, for example, a user interface (UI) connected to the controller 4 and receives the input of the motor flux of the synchronous electric motor 6 from the user. The motor flux can be measured at the time of, for example, designing the synchronous electric motor 6. The motor flux may be stored in advance in, for example, the initial value arithmetic calculation unit 32 of the controller 4.

The operation of the drive apparatus 100 will be described next. FIG. 2 is a flowchart showing an electric motor method as an operation until the shift to position sensor-less control of the drive apparatus 100. Assume that in this operation in FIG. 2, an electric motor resistance and a motor flux are set in advance.

In step S1 after the startup of the drive apparatus 100, the mode determination unit 15 executes the determination of the rotation state of the synchronous electric motor 6. The determination of the rotation state is performed based on a signal corresponding to the DC current detected by the current detector 3. Accordingly, the mode determination unit 15 causes the free-run startup control unit 14 to execute switching among the switching elements of the power conversion device 1 in the special switching mode. Assume that the synchronous electric motor 6 is rotating. In this case, if each switching element of the power conversion device 1 is turned on/off in the special switching mode, the current detector 3 detects a DC current accompanying the electromotive force of the synchronous electric motor 6. In contrast, assume that the synchronous electric motor 6 is not rotating. In this case, even if each switching element of the power conversion device 1 is turned on/off in the special switching mode, the current detector 3 detects no DC current. That is, the rotation state of the synchronous electric motor 6 can be determined depending on whether the current detector 3 detects a current.

In step S2, the mode determination unit 15 determines whether the synchronous electric motor 6 is rotating, that is, free-run startup is executed. Upon determining that a current is detected by the current detector 3 via the free-run startup control unit 14 and the current detection unit 11, the mode determination unit 15 determines that the synchronous electric motor 6 is rotating. If the mode determination unit 15 determines in step S2 that the synchronous electric motor 6 is not rotating, the process shifts to step S3. If the mode determination unit 15 determines in step S2 that the synchronous electric motor 6 is rotating, the process shifts to step S5.

In step S3, upon determining that normal startup is executed, the mode determination unit 15 causes the normal startup control unit 16 to execute forced commutation. That is, the normal startup control unit 16 causes each switching element of the power conversion device 1 to execute switching in the normal switching mode at a specific frequency for starting up the synchronous electric motor 6. Switching to the normal switching mode allows the current detection unit 11 to generate three-phase currents $I_u$, $I_v$, and $I_w$ of the synchronous electric motor 6 from the DC current detected by the current detector 3 by various types of three-phase current reconstruction methods.

In step S4, the mode determination unit 15 determines whether a mode shift condition. If, for example, a predetermined forced commutation period has elapsed, the mode determination unit 15 determines that the mode shift condition is satisfied. The process stands by until it is determined in step S4 that the mode shift condition is satisfied. If it is determined in step S4 that the mode shift condition is satisfied, the mode of the drive apparatus 100 shifts to the position sensor-less control mode.

In the position sensor-less control mode, the magnetic flux arithmetic calculation unit 12 performs three to two phase conversion of the three-phase currents $I_u$, $I_v$, and $I_w$ and three-phase output voltage command values $V_u$, $V_v$, and $V_w$ supplied from the output voltage control unit 13 according to equations (1) and (2).

$$\begin{pmatrix} I_\alpha \\ I_\beta \end{pmatrix} = \begin{pmatrix} 1 & -1/2 & -1/2 \\ 0 & \sqrt{3}/2 & \sqrt{3}/2 \end{pmatrix} \begin{pmatrix} I_u \\ I_v \\ I_w \end{pmatrix} \quad (1)$$

$$\begin{pmatrix} V_\alpha \\ V_\beta \end{pmatrix} = \begin{pmatrix} 1 & -1/2 & -1/2 \\ 0 & \sqrt{3}/2 & \sqrt{3}/2 \end{pmatrix} \begin{pmatrix} V_u \\ V_v \\ V_w \end{pmatrix} \quad (2)$$

After the three to two phase conversion, the magnetic flux arithmetic calculation unit 12 arithmetically calculates armature flux linkages generated in the stator winding of the synchronous electric motor 6. Armature flux linkages $\phi_\alpha$ and $\phi_\beta$ are obtained by equation (3). In this case, $R_a$ in equation (3) represents the electric motor resistance given by the electric motor resistance setting unit 22. Equation (3) is arithmetically calculated by using, for example, imperfect integrator or second-order general integrator.

$$\begin{cases} \phi_\alpha = \int (V_\alpha - R_a I_\alpha) dt \\ \phi_\beta = \int (V_\beta - R_a I_\beta) dt \end{cases} \quad (3)$$

Upon arithmetic calculation of the armature flux linkages $\phi_\alpha$ and $\phi_\beta$, the magnetic flux arithmetic calculation unit 12 obtains a phase $\theta$ of an armature flux linkage as the rotational position of the synchronous electric motor 6. The phase $\theta$ is obtained according to equation (4).

$$\theta = \operatorname{atan} \frac{\phi_\alpha}{\phi_\beta} \quad (4)$$

The output voltage control unit 13 obtains the three-phase output voltage command values $V_u$, $V_v$, and $V_w$ according to equations (5) and (6) using a torque component voltage command $V_T$ and a phase component voltage command $V_M$, supplied from the voltage amplitude setting unit 21, and the phase $\theta$ arithmetically calculated by the magnetic flux arithmetic calculation unit 12.

$$\begin{pmatrix} V_\alpha \\ V_\beta \end{pmatrix} = \begin{pmatrix} \cos\theta & -\sin\theta \\ \sin\theta & \cos\theta \end{pmatrix} \begin{pmatrix} V_M \\ V_T \end{pmatrix} \quad (5)$$

$$\begin{pmatrix} V_u \\ V_v \\ V_w \end{pmatrix} = \begin{pmatrix} 1 & 0 \\ -1/2 & \sqrt{3}/2 \\ -1/2 & \sqrt{3}/2 \end{pmatrix} \begin{pmatrix} V_\alpha \\ V_\beta \end{pmatrix} \quad (6)$$

The output voltage control unit 13 generates an ON/OFF command for each switching element by comparing the three-phase output voltage command values $V_u$, $V_v$, and $V_w$ obtained by equation (6) with a carrier such as a triangular wave. The output voltage control unit 13 then outputs this ON/OFF command to the mode determination unit 15. The mode determination unit 15 turns on/off each switching element of the power conversion device 1 according to the ON/OFF command from the output voltage control unit 13. This rotates the synchronous electric motor 6 in the rotational direction at the rotational speed, which are given by the voltage amplitude setting unit 21. In addition, the output voltage control unit 13 outputs the three-phase output voltage command values $V_u$, $V_v$, and $V_w$ obtained by equation (6) to the magnetic flux arithmetic calculation unit 12 for the next arithmetic calculation by the magnetic flux arithmetic calculation unit 12. Subsequently, a similar operation is repeated until the issuance of an instruction to stop the synchronous electric motor 6.

If it is determined in step S5 that the startup is free-run startup, the free-run startup control unit 14 detects the phase of an armature flux linkage as the rotational speed and rotational position of the synchronous electric motor 6 from the DC current detected by the current detector 3 via the current detection unit 11. Upon detecting the rotational position, the free-run startup control unit 14 notifies the mode determination unit 15 of the corresponding information. Subsequently, the process shifts to step S6.

In step S6, the mode determination unit 15 causes the normal startup control unit 16 to execute forced commutation at a constant speed upon switching to the normal switching mode.

In step S7, the magnetic flux arithmetic calculation unit 12 estimates the rotational position of the synchronous electric motor 6 during free-run startup. The estimation of the rotational position of the magnetic flux arithmetic calculation unit 12 will be described below.

First of all, the magnetic flux arithmetic calculation unit 12 performs three to two phase conversion of the three-phase currents $I_u$, $I_v$, and $I_w$ and the three-phase output voltage command values $V_u$, $V_v$, and $V_w$ supplied from the output voltage control unit 13 according to equations (1) and (2). In this case, a rotational position $\theta_M$ detected in step S5 is used instead of the phase $\theta$ to generate the three-phase output voltage command values $V_u$, $V_v$, and $V_w$ when a rotational position is estimated in step S7.

Upon three to two phase conversion, the magnetic flux arithmetic calculation unit 12 arithmetically calculates armature flux linkages generated in the stator winding of the synchronous electric motor 6. In this case, as described above, the arithmetic calculation based on equation (3) to obtain the armature flux linkages $\phi_\alpha$ and $\phi_\beta$ includes integral calculation. In the case of free-run startup, since forced commutation is performed from the idling state of the synchronous electric motor 6, the rotation state is unstable. For this reason, unless a proper initial value (integral constant) is given in arithmetic calculation based on equation (3), a DC offset remains in an arithmetic calculation result, resulting in an error in an estimated position. A DC offset can be removed by using an imperfect integrator or second-order general integrator in integral calculation. Even using an imperfect integrator or second-order general integrator cannot obtain a result without any error immediately after integral calculation. Accordingly, if no proper initial value is given, a settling time is required until an arithmetic calculation result becomes stable.

In this embodiment, the initial value arithmetic calculation unit 32 calculates the initial value of an armature flux linkage for integral calculation based on the rotational position estimated in step S5. The magnetic flux arithmetic calculation unit 12 then executes integral calculation in consideration of the initial value calculated by the initial value arithmetic calculation unit 32. The initial value of the armature flux linkage is obtained according to equation (7) based on the phase $\theta_M$ detected in step S5 and the magnet magnetic flux $\phi_M$ of the synchronous electric motor 6 which is set by the electric motor magnetic flux setting unit 31.

$$\begin{pmatrix} \phi_{\alpha 0} \\ \phi_{\beta 0} \end{pmatrix} = \begin{pmatrix} \cos\theta_M \\ \sin\theta_M \end{pmatrix} \phi_M \tag{7}$$

Integral calculation is performed in consideration of the initial magnetic flux according to equation (8).

$$\begin{cases} \phi_\alpha = \int (V_\alpha - R_a I_\alpha) dt + \phi_{\alpha 0} \\ \phi_\beta = \int (V_\beta - R_a I_\beta) dt + \phi_{\beta 0} \end{cases} \tag{8}$$

In this manner, in this embodiment, the proper initial value of a magnetic flux is given based on the rotational position of the synchronous electric motor 6 which is estimated from the DC current detected by the current detector 3 during free-run startup. Accordingly, it is expected to shorten the time until the convergence of the rotational position estimation result to a true value. It is therefore expected to shorten the settling period.

Referring back to FIG. 2, in step S8 after the estimation of the rotational position, the mode determination unit 15 determines whether a mode shift condition is satisfied. The mode determination unit 15 determines that the mode shift condition is satisfied, if, for example, a predetermined forced commutation period has elapsed. In this embodiment, since the proper initial value of a magnetic flux is given, the estimation accuracy of the phase of an armature flux linkage as a rotational position is expected to be early stabilized. Accordingly, the settling time in free-run startup can be shorted. The process stands by until it is determined in step S8 that the mode shift condition is satisfied. If it is determined in step S8 that the mode shift condition is satisfied, the mode of the drive apparatus 100 shifts to the position sensor-less control mode.

In the case of shift from free-run startup to the position sensor-less control mode, the output voltage control unit 13 also obtains the three-phase output voltage command values $V_u$, $V_v$, and $V_w$ by using the torque component voltage command $V_T$ and the phase component voltage command $V_M$, given from the voltage amplitude setting unit 21, and the phase $\theta$ arithmetically calculated by the magnetic flux arithmetic calculation unit 12. Note, however, that at least immediately after the shift to the position sensor-less control mode, the output voltage control unit 13 obtains the three-phase output voltage command values $V_u$, $V_v$, and $V_w$ by using the phase calculated from the arithmetic calculation result of equation (8) based on equation (4). Subsequently, an operation similar to that in the case of shift from normal startup to the position sensor-less control mode may be performed.

As described above, in the electric motor system that executes position sensor-less control by estimating the rotational position of the synchronous electric motor by obtaining an armature flux linkage, the electric motor drive apparatus according to the embodiment can shorten the settling time, in particular, until the stabilization of a position estimation result at the time of free-run startup. If control is executed while a position estimation result is not stabilized, noise or step-out can occur accompanying the distortion of a motor current. Shortening the time until the stabilization of a position estimation result will stably execute the shift to position sensor-less control without causing noise or step-out at the time of free-run startup.

In this case, in the embodiment, integral calculation is used for arithmetic calculation of an armature flux linkage for the estimation of the rotational position of the synchronous electric motor. However, the embodiment can be applied to an electric motor drive apparatus that arithmetically calculates an armature flux linkage by an arbitrary technique. That is, even if an armature flux linkage is arithmetically calculated by another method, consideration can be given to the initial magnetic flux calculated by equation (7).

In addition, in the embodiment, arithmetic calculation of an armature flux linkage in consideration of an initial magnetic flux is executed at the time of free-run startup. In contrast to this, arithmetic calculation of an armature flux linkage in consideration of the initial magnetic flux indicated by equation (8) may be used in arithmetic calculation of an armature flux linkage at the time of normal startup and during position sensor-less control.

Furthermore, in the embodiment, the synchronous electric motor is a three-phase synchronous electric motor. In contrast to this, the embodiment can be applied to an n-phase synchronous electric motor including a three-phase synchronous electric motor.

Moreover, each processing in the above embodiment can be stored as a program that can be executed by the controller 4 that can operate as a computer. Such programs can be distributed by being stored in the storage media in external storage devices such as magnetic disks, optical disks, and semiconductor memories. The controller 4 reads the program stored in the storage medium in such an external storage device. The operation of the controller 4 is then controlled by the read program, thereby executing the above processing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electric motor drive apparatus comprising:
   an electric motor;
   a power conversion device configured to generate AC power for driving the electric motor by turning on and off a plurality of switching elements, and
   a controller configured to control the power conversion device; and
   a current detector configured to detect a flowing current in the electric motor,
      wherein, in a case where free-run startup of the electric motor is performed, the controller calculates, as a rotational position of the electric motor, a phase of an armature flux linkage of the electric motor using, as an initial value, an armature flux linkage of the electric motor calculated by:
         a rotational position of the electric motor estimated from the flowing current detected by the current detector in a special switching mode in which an operation of turning on one of the plurality of switching elements and turning off the remaining switching elements is repeated while sequentially switching the switching element to be turned on; and
         a magnet magnetic flux of the electric motor measured in advance.

2. The electric motor drive apparatus according to claim 1, wherein the phase of the armature flux linkage of the electric motor is calculated by integral calculation using the flowing current detected by the current detector.

3. An electric motor drive method in an electric motor drive apparatus including an electric motor, a power conversion device configured to generate AC power for driving the electric motor, a controller configured to control the power conversion device, and a current detector configured to detect a flowing current in the electric motor, the method comprising:
   calculating a phase of an armature flux linkage of the electric motor as a rotational position of the electric motor by using the flowing current detected by the current detector; and
   generating a voltage command for controlling the power conversion device based on the armature flux linkage,
      wherein, in a case where free-run startup of the electric motor is performed, calculating, as a rotational position of the electric motor, a phase of an armature flux linkage of the electric motor using, as an initial value, an armature flux linkage of the electric motor calculated by:
         estimating a rotational position of the electric motor from the flowing current detected by the current detector in a special switching mode in which an operation of turning on one of the plurality of switching elements and turning off the remaining switching elements is repeated while sequentially switching the switching element to be turned on; and
         measuring magnet magnetic flux of the electric motor in advance.

4. A non-transient storage medium readable by a computer of a controller and storing a drive program for an electric motor drive apparatus including an electric motor, a power conversion device configured to generate AC power for driving the electric motor, the controller configured to control the power conversion device, and a current detector configured to detect an flowing current in the electric motor, the drive program causing the computer of the controller to:
   calculate a phase of an armature flux linkage of the electric motor as a rotational position of the electric motor by using the flowing current detected by the current detector; and
   generate a voltage command for controlling the power conversion device based on the armature flux linkage,
      wherein, in a case where free-run startup of the electric motor is performed, calculating, as a rotational position of the electric motor, a phase of an armature flux linkage of the electric motor using, as an initial value, an armature flux linkage of the electric motor calculated by:
         estimating a rotational position of the electric motor from the flowing current detected by the current detector in a special switching mode in which an operation of turning on one of the plurality of switching elements and turning off the remaining switching elements is repeated while sequentially switching the switching element to be turned on; and
         measuring magnet magnetic flux of the electric motor in advance.

* * * * *